United States Patent
Burek et al.

(10) Patent No.: US 7,627,223 B1
(45) Date of Patent: Dec. 1, 2009

(54) STORAGE CABINET FOR SLACK FIBER OPTIC CABLING

(75) Inventors: Denis E. Burek, Cumming, GA (US); Clem McConnell, Gastonia, NC (US); Willard C. White, III, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/218,546

(22) Filed: Jul. 16, 2008
(Under 37 CFR 1.47)

(51) Int. Cl.
*G02B 6/00* (2006.01)

(52) U.S. Cl. .................. 385/135; 385/134; 385/136

(58) Field of Classification Search ................ 385/135, 385/136; 174/50
See application file for complete search history.

(56) References Cited

U.S. PATENT DOCUMENTS

| | | | |
|---|---|---|---|
| 4,709,980 A | 12/1987 | Coll et al. | |
| 5,737,475 A * | 4/1998 | Regester | 385/134 |
| 5,884,001 A | 3/1999 | Cloud et al. | |
| 5,894,540 A * | 4/1999 | Drewing | 385/135 |
| 5,909,298 A * | 6/1999 | Shimada et al. | 398/164 |
| 5,913,006 A * | 6/1999 | Summach | 385/134 |
| 5,923,753 A | 7/1999 | Haataja et al. | |
| 6,148,133 A | 11/2000 | Daoud | |
| 6,256,444 B1 * | 7/2001 | Bechamps et al. | 385/134 |
| 6,318,680 B1 | 11/2001 | Benedict et al. | |
| 6,398,149 B1 * | 6/2002 | Hines et al. | 242/399 |
| 6,470,129 B1 | 10/2002 | Wentworth et al. | |
| 6,487,356 B1 | 11/2002 | Harrison et al. | |
| 6,571,047 B1 * | 5/2003 | Yarkosky et al. | 385/135 |
| 6,580,866 B2 | 6/2003 | Daoud et al. | |
| 7,034,227 B2 | 4/2006 | Fox | |
| 7,083,051 B2 * | 8/2006 | Smith et al. | 211/26 |
| 7,167,625 B2 | 1/2007 | Haataja et al. | |
| 7,295,747 B2 | 11/2007 | Solheid et al. | |
| 7,346,253 B2 | 3/2008 | Bloodworth et al. | |
| 7,369,740 B2 * | 5/2008 | Tinucci | 385/135 |
| 7,513,374 B2 * | 4/2009 | Smith et al. | 211/26.2 |
| 2009/0010607 A1 * | 1/2009 | Elisson et al. | 385/135 |

* cited by examiner

*Primary Examiner*—Ryan Lepisto
(74) *Attorney, Agent, or Firm*—Law Office of Leo Zucker; Michael A. Morra; Edward V. Charbonneau

(57) ABSTRACT

Apparatus for storing slack fiber optic cabling. A cabinet enclosure has an opening for allowing access to cabling and other components inside the enclosure, and a number of spool tracks are supported inside the enclosure. Each of a number of cable spool assemblies includes a spool dimensioned to guide a length of fiber optic cabling in a desired path over part of the spool circumference with at least a minimum cable bend radius, and a mechanism for (i) mounting the spool on a corresponding spool track for sliding movement to a desired position along the track, and (ii) fixing the spool at the desired position. Slack fiber optic cabling can be stored in the cabinet with an optimum lay when the cabling is guided by selected spools of the spool assemblies, and the spools are moved to and fixed at certain positions on the spool tracks.

12 Claims, 6 Drawing Sheets

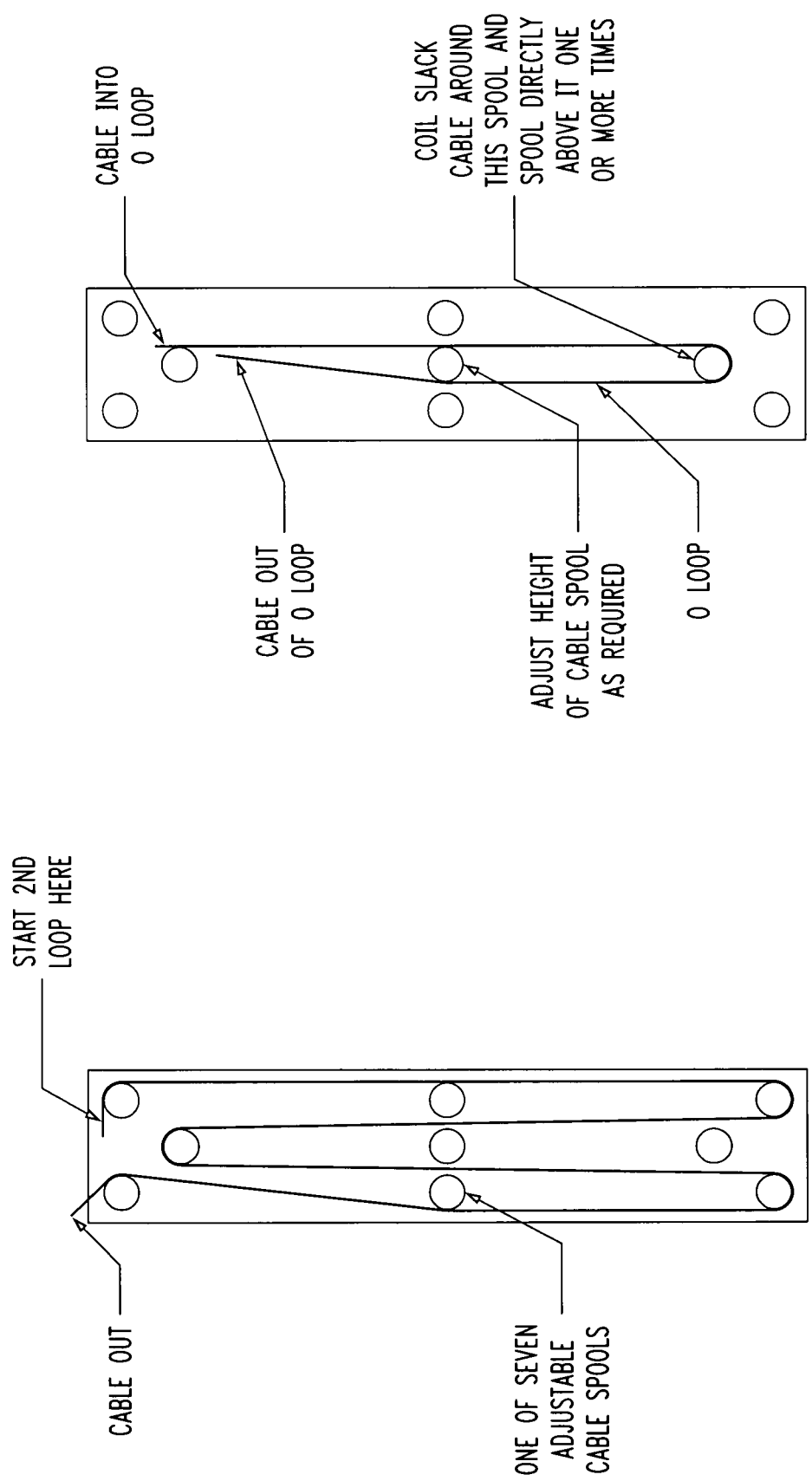

STORAGE CABINET FOR SLACK FIBER OPTIC CABLING

BACKGROUND OF THE INVENTION

1. Field of the Invention

The present invention relates to structures for storing communications cables, and particularly to apparatus for storing slack fiber optic cabling.

2. Discussion of the Known Art

Fiber optic switching centers typically house a number of pieces of switching and routing equipment in rooms where floor space is at a premium. While exact locations for each piece of equipment may be planned prior to installation, the installers often do not situate the equipment precisely at those locations for various reasons. Also, fiber optic cables that are routed to the equipment are costly since they must be supplied with factory installed connectors to accommodate as many as, e.g., 72 fibers in each cable. If only one fiber in a cable is found to have an unacceptable high insertion loss, then a new cable with pre-installed connectors must be substituted since the old cable cannot be repaired in the field.

Therefore, to ensure that cables in a switching center are able to reach the equipment to which they are routed and a worst-case scenario of a "short" cable does not occur, the cables are made longer than would be needed if each piece of equipment was installed exactly where planned. The excess cable length is referred to as "slack", and cables that connect to the equipment will have a certain amount of slack that must be taken up and properly stowed near the associated equipment to avoid cable damage. For example, in a modern switching center, as much as 60 feet of slack may exist for each of a number of fiber optic cables associated with a single router.

So-called cable troughs in the form of open rectangular channels may be used to store cable slack. See, for example, U.S. Pats. No. 6,318,680 (Nov. 20, 2001), No. 6,470,129 (Oct. 22, 2002), and No. 7,034,227 (Apr. 25, 2006). With respect to fiber optic cables, however, care must be taken to lay the cable in the trough so that no part of the cable is urged toward a position where it will assume less than a certain minimum bend radius. Otherwise, one or more fibers in the cable may break or become irreparably damaged. This constraint may be difficult to realize if a slack portion of the cable must be layered by folding on itself in order to contain all the slack inside the trough.

U.S. Pat. No. 6,487,356 (Nov. 26, 2002) discloses apparatus that provides storage for fiber optic cable slack, and for segregation of cables at the front and the back sides of a line bay chassis. Slack spool assemblies are fixed at either side of the chassis to provide for storage of fiber optic cables routed toward the top and at the bottom of the chassis. Slack storage trays and holders constructed to limit the bend of optical fibers are also known. See, e.g., U.S. Pats. No. 6,580,866 (Jun. 17, 2003), No. 7,295,747 (Nov. 13, 2007), and No. 7,346,253 (Mar. 18, 2008).

A need remains, however, for apparatus than can store long lengths of slack presented by many fiber optic cables routed to various pieces of equipment at a switching center or elsewhere, within a relatively small volume and without damaging the cable fibers.

SUMMARY OF THE INVENTION

According to the invention, apparatus for storing slack fiber optic cabling includes a cabinet enclosure having an opening for accessing cabling and other components inside the enclosure, and a number of spool tracks supported inside the enclosure. Each of a number of cable spool assemblies includes a cylindrical spool dimensioned to guide a length of fiber optic cabling in a desired path over part of the circumference of the spool with at least a certain minimum cable bend radius, and a mechanism for (i) mounting the spool on a corresponding spool track for sliding movement to a desired position along the track, and (ii) fixing the spool at the desired position. Slack fiber optic cabling can be stored in the cabinet with an optimum lay when the cabling is guided by selected spools of the spool assemblies, and the spools are moved to and fixed at certain positions on the spool tracks.

For a better understanding of the invention, reference is made to the following description taken in conjunction with the accompanying drawing and the appended claims.

BRIEF DESCRIPTION OF THE DRAWING

In the drawing:

FIG. 8 shows an example of the lay of a third length of slack cable around the spool assemblies; and FIG. 9 shows an example of the lay of a fourth length of slack cable around the spool assemblies.

DETAILED DESCRIPTION OF THE INVENTION

Figure 1:
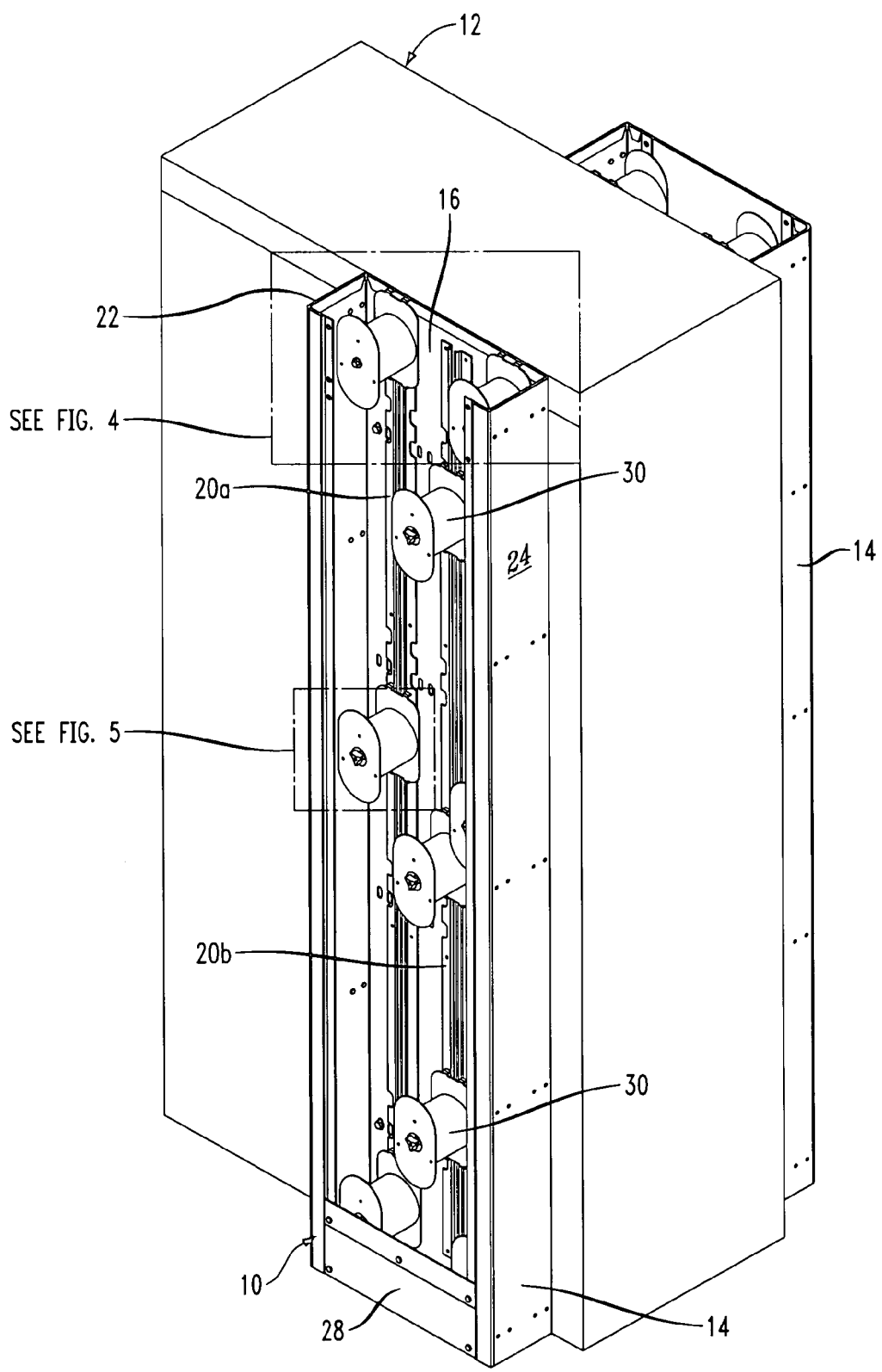
FIG. 1 is a perspective view showing two slack cable storage cabinets according to the invention, mounted on opposite sides of a router.
Figure 2:
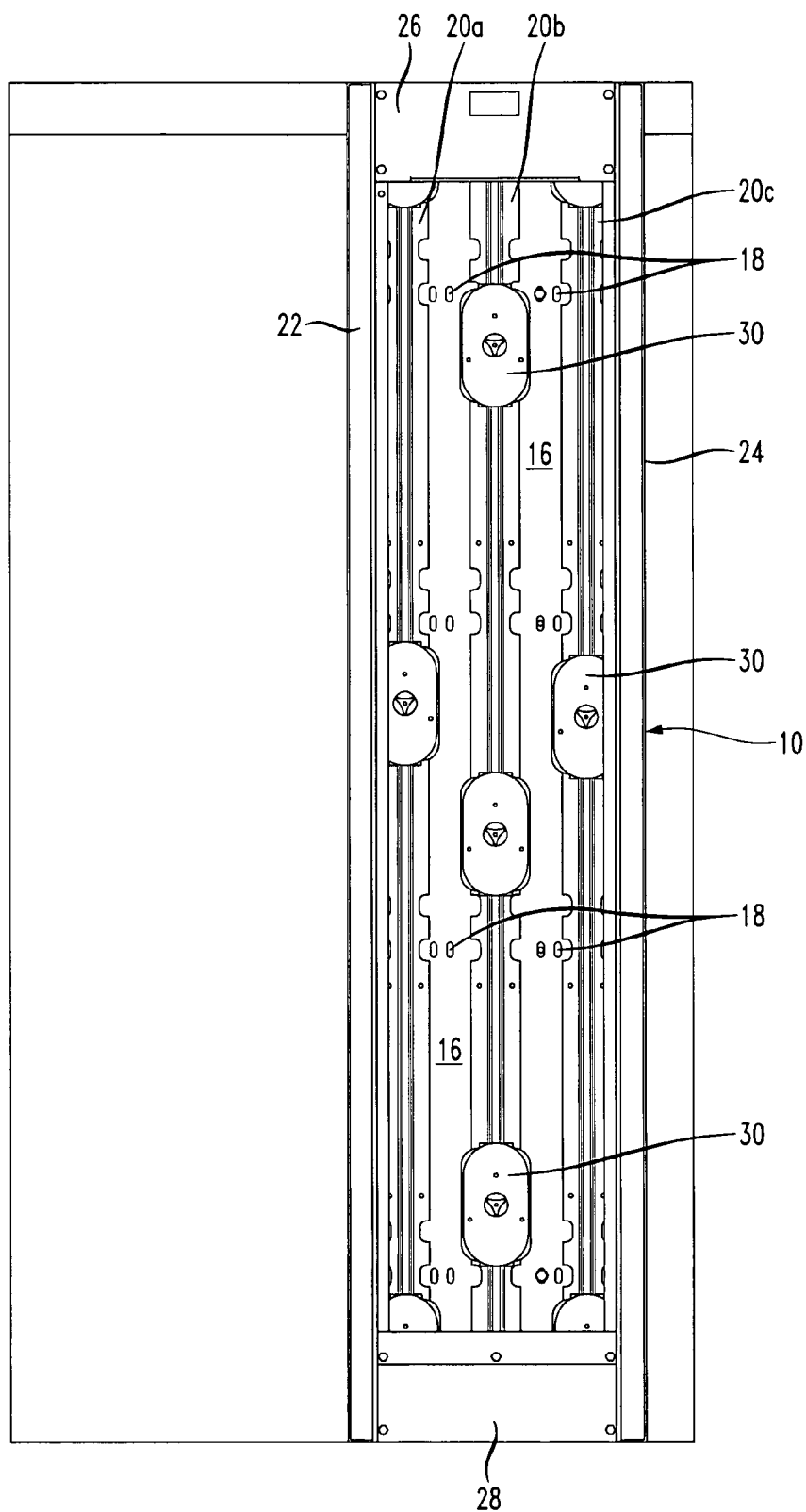
FIG. 2 is a front elevation view of one of the inventive storage cabinets in FIG. 1.

FIG. 1 shows two of the inventive slack cable storage cabinets 10 fixed externally on opposite side walls of a cabinet 12 that encloses, e.g., a router. FIG. 2 is a front elevation view of one of the cabinets 10 in FIG. 1. While two of the cabinets 10 may be needed to accommodate slack from all of the cables leading to the router in FIG. 1, it will be understood that cable slack associated with any given piece of equipment may be stored in a single cabinet 10 as long as the amount of slack from all cables leading to the equipment does not exceed the capacity of the cabinet 10.

Each cabinet 10 has a cabinet enclosure 14 which, for example, may be dimensioned to conform with the height of a given equipment cabinet such as the cabinet 12 for the router in FIG. 1. For example, a cabinet enclosure measuring 83 inches high, 18 inches wide and six inches deep has been fabricated and found to work satisfactorily. Further, a rear wall 16 of the enclosure 14 may have a number of mounting holes 18 (FIG. 2), or the enclosure 14 may otherwise be constructed to enable fixing the enclosure 14 externally on a side of a given equipment cabinet. To enhance structural integrity, removable front panels 26, 28 are preferably fixed to and extend between side walls 22, 24 of the cabinet enclosure 14 at the top and the bottom of the enclosure as shown in FIG.

2. While not shown in the drawing, the cabinet 10 preferably has a door that can be securely fastened over the front opening of the enclosure 14 between the side walls 22, 24 using, e.g., a number of captive screws. To gain access to cabling and other components inside the enclosure, the screws can be withdrawn and the door removed, e.g., by grasping a conveniently located door handle.

One or more elongated spool tracks are supported inside the cabinet enclosure 14, for example, by fixing the tracks against the inside surface of the rear wall 16 so that the tracks are vertically oriented and parallel to one another. In the illustrated embodiment, three spool tracks 20a, 20b and 20c are provided wherein center track 20b is aligned midway between the side walls 22, 24, and tracks 20a, 20c are spaced a certain distance from either side of the center track 20b.

Figure 4:
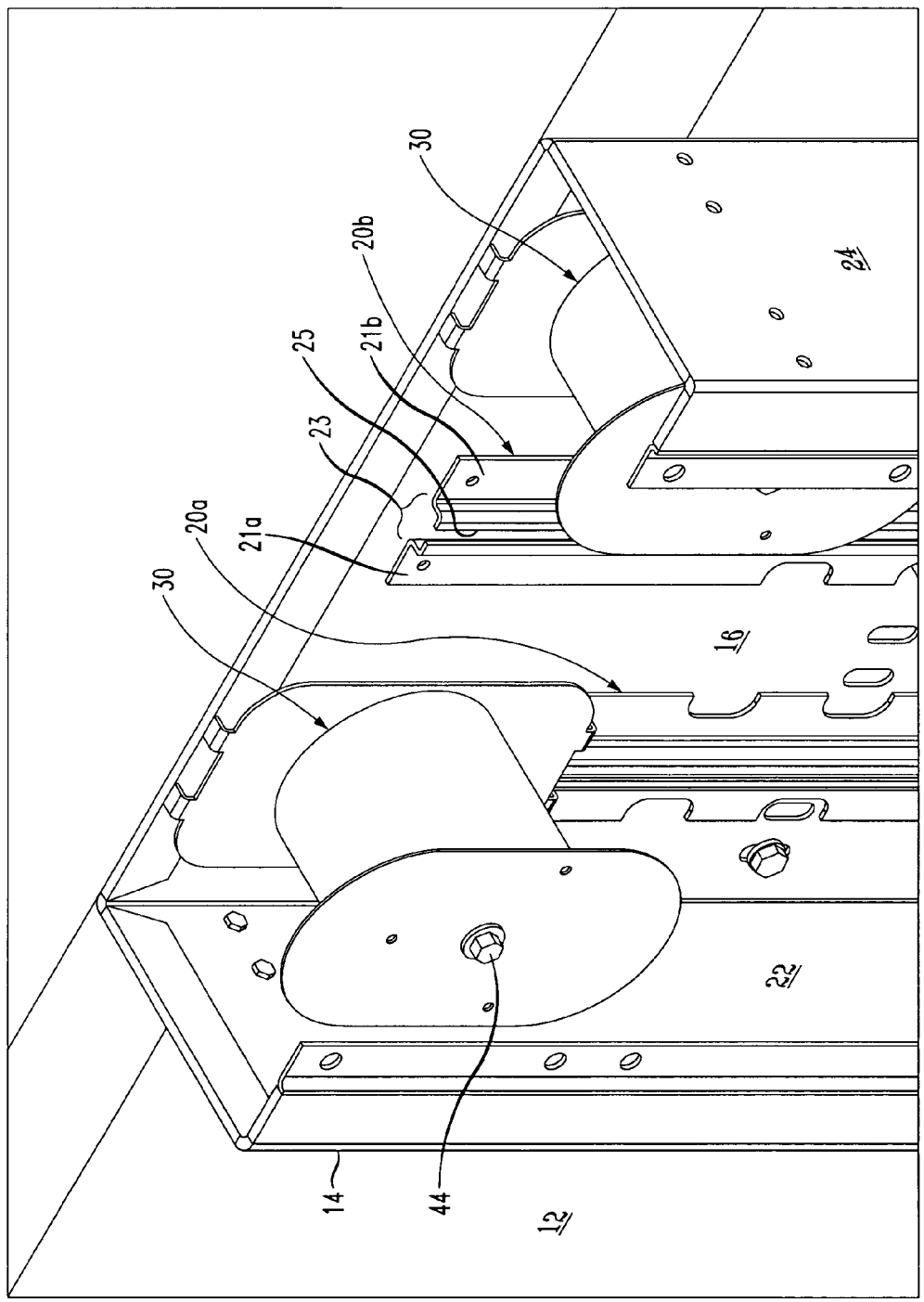
FIG. 4 is a view showing details of a spool track according to the invention, and two of the cable spool assemblies of FIG. 3 positioned to act as bend limiters at cable ingress and egress locations in the inventive cabinet.

As seen for example in FIG. 4 for the spool track 20b, each spool track is formed by elongated bars 21a, 21b each having a "Z" profile or cross section, with a lower flange wall of each bar fixed against the rear wall 16 of the enclosure 14. The intermediate walls or webs of each of the bars 21a, 21b together define a track rail 23 that projects a certain height from the rear wall 16. The upper flanges or walls of the bars 21a, 21b have their free edges facing one another and spaced apart to define a central slot 25 over the length of the spool track 20b.

Figure 3:
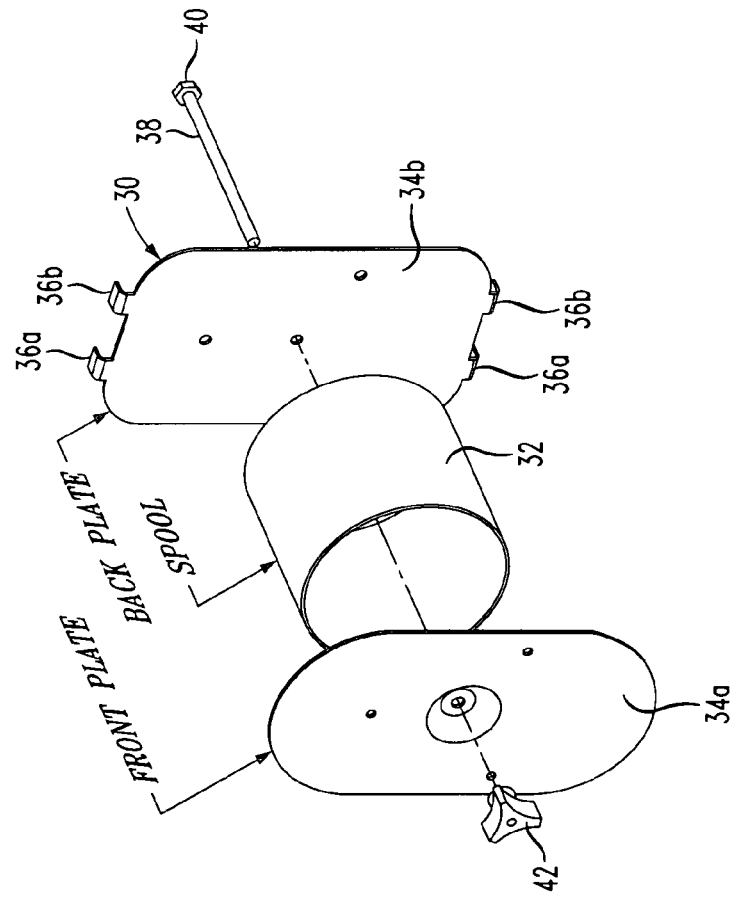
FIG. 3 is an assembly view of a cable spool assembly according to the invention.

A number of cable spool assemblies 30 are mounted for movement along corresponding ones of the spool tracks 20a, 20b, 20c. As shown in FIG. 3, each one of the cable spool assemblies 30 has a cylindrical spool 32 that is dimensioned to guide a length of fiber optic cabling in a desired path over part of the circumference of the spool 32 with at least a certain minimum bend radius. For example, for slack cable to be stored in the cabinet 10, a typical minimum bend radius is about one inch. Spools 32 each having an outer diameter of about 4.00 inches (corresponding to twice the minimum bend radius) and an axial length of about 3.72 inches, have been fabricated and found to work satisfactorily. See FIGS. 6 to 9 and related text below.

Front and back plates 34a, 34b are spot welded or otherwise fixed at each axial end of the spool 32, and the plates extend beyond the circumference of the spool enough to keep slack cable that is guided by the spool from sliding off of the spool. Pairs of tabs 36a, 36b at top and bottom edges of the back plate 34b project in a direction away from the spool 32. The tabs 36a, 36b of each pair are spaced apart by a distance that corresponds to the width of the track rail 23 (see FIGS. 4 and 5) of the spool track on which the assembly 30 is to be mounted. The front and the back plates 34a, 34b each have a central opening for passage of a bolt 38. The bolt 38 has a head 40 that is wider than the central slot 25 in the track rail 23, but is otherwise dimensioned so that the head 40 can be seated between the webs of the bars 21a, 21b in FIG. 4 that form each of the spool tracks 20a-20c. The shaft of the bolt 38 adjacent the head 40 is dimensioned to pass through and slide vertically within the slot 25 in the track rail 23 when the bolt head 40 is seated behind the slot 25 and a remaining forward portion of the shaft extends forward and perpendicular to the track rail 23. away from the spool 32. The tabs 36a, 36b of each pair are spaced apart by a distance that corresponds to the width of the track rail 23 (see FIGS. 4 and 5) of the spool track on which the assembly 30 is to be mounted. The front and the back plates 34a, 34b each have a central opening for passage of a bolt 38. The bolt 38 has a head 40 that is wider than the central slot 25 in the track rail 23, but is otherwise dimensioned so that the head 40 can be seated between the webs of the bars 21a, 21b in FIG. 4 that form each of the spool tracks 20a-20c. The shaft of the bolt 38 adjacent the head 40 is dimensioned to pass through and slide vertically within the slot 25 in the track rail 23 when the bolt head 40 is seated behind the slot 25 and a remaining forward portion of the shaft extends forward and perpendicular to the track rail 23.

As seen in FIG. 3, the forward portion of the shaft of the bolt 40 passes through the central openings in the back and the front plates 34b, 34a of the spool assembly 30, coincident with the axis of the spool 32 fixed between the plates. In the illustrated embodiment, a forward end of the bolt 38 is threaded, and a knob 42 is provided for engaging the bolt threads which project forward of the front plate 34a.

Figure 5:
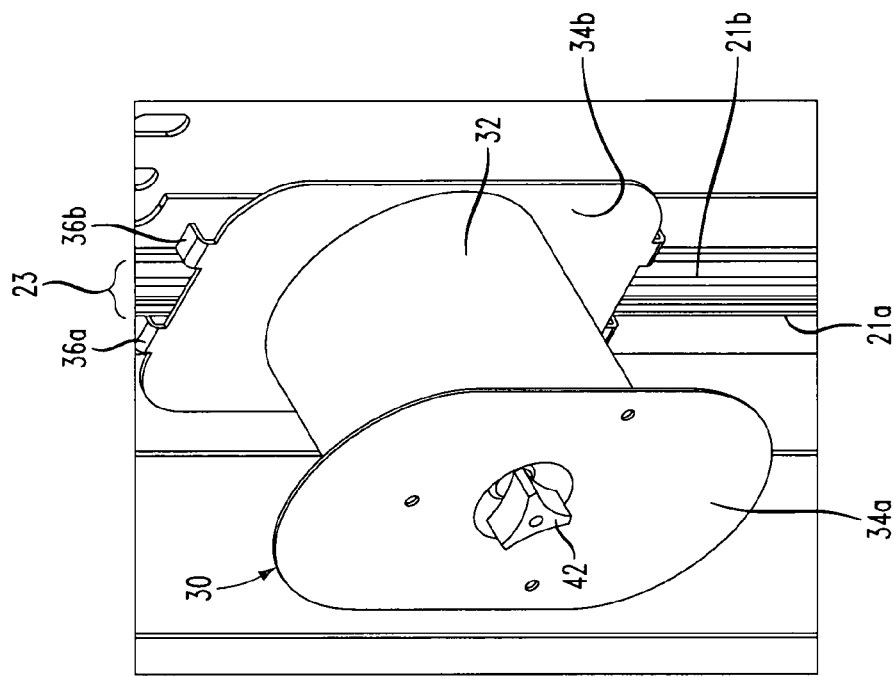
FIG. 5 is a perspective view showing a cable spool assembly mounted for movement on a spool track according to the invention.

FIGS. 3, 4 and 5 together illustrate an example of how a spool 32 of a given spool assembly is mounted for movement to a desired position along the length of a corresponding spool track inside the cabinet enclosure 14. Specifically, the spool may be mounted by (1) locating the head 40 of bolt 38 of the assembly behind the slot 25 in the track by inserting the head side ways through an open end of the track (e.g., the open top end of track 20b visible in FIG. 4) while sliding the bolt shaft side ways into the slot 25, (2) passing the bolt shaft through the openings in the back and the front plates 34b, 34a of the spool assembly and allowing the fingers 36a, 36b on the back plate 34b to straddle the sides of the track rail 23 and thus restrain the spool from rotation relative to the rail, (3) moving the spool to the desired position along the length of the track, and (4) fixing the spool at the desired position by tightening the knob 42 against the front plate 34a of the spool assembly, thereby urging the back plate 34b against the track rail 23 and holding the spool assembly in place by friction.

One or more of the spools 32 are preferably located in the cabinet enclosure 14 to act as cable bend limiters at regions where stored slack fiber optic cabling enters and exits the cabinet 10. For example and as shown in FIG. 4, two of the spools 32 are fixed in position atop the left and the right side tracks 20a, 20c where slack cable can enter and exit from an open top of the cabinet 10. In place of the knob 42 in FIGS. 3 and 5, a locking nut 44 or other fastening device may be used to engage the bolts of the spool assemblies 30 in FIG. 4 so as to ensure the spools will not be inadvertently repositioned by persons working on site.

In the following examples of FIGS. 6 to 9, it is assumed that in addition to the two uppermost spools 32 acting as cable bend limiters, seven spools are mounted on the tracks 20a, 20b, 20c inside the cabinet 10 as shown.

Figures 6, 7:
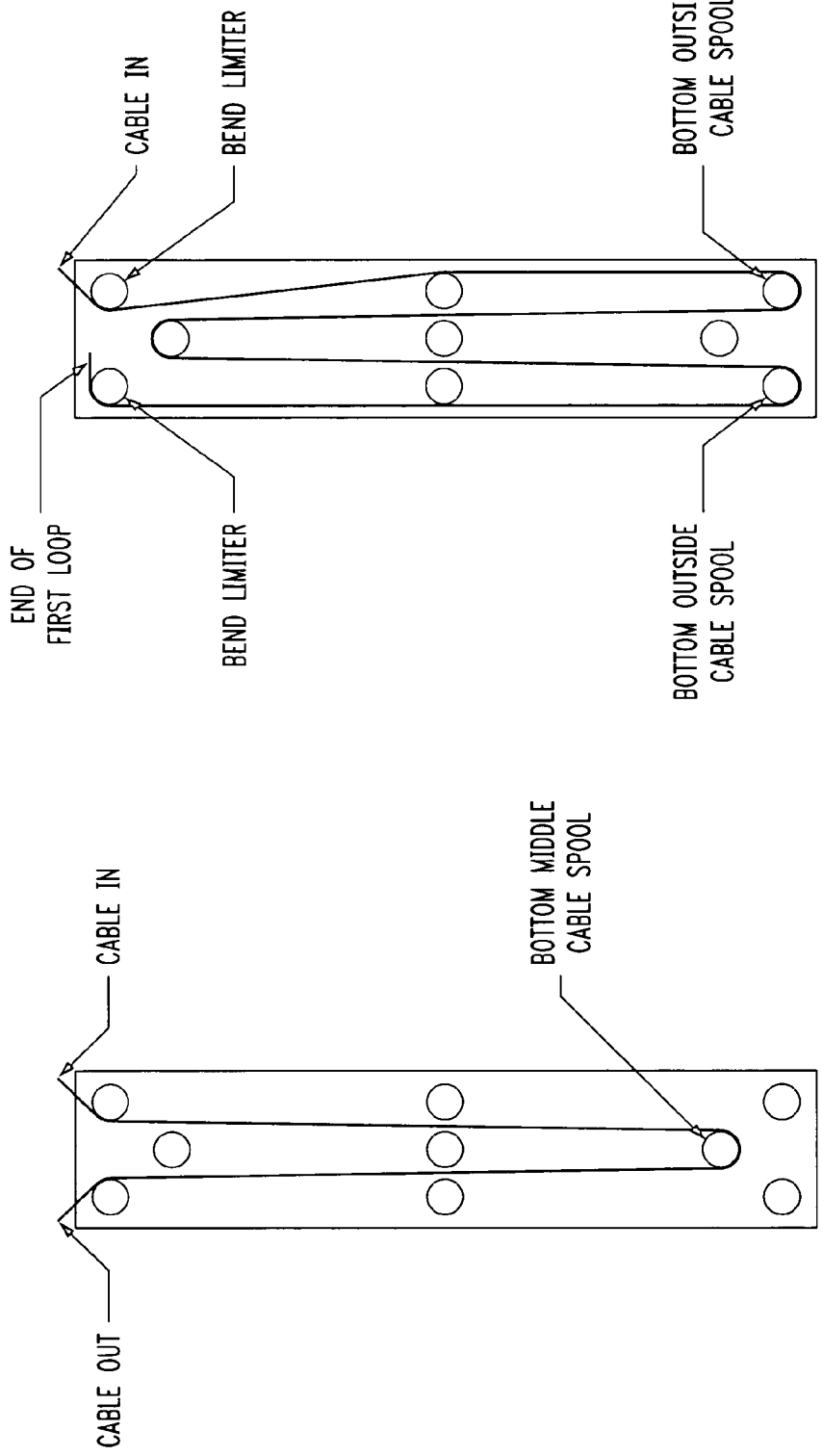
FIG. 6 shows an example of the lay of a first length of slack cable around the spool assemblies.
FIG. 7 shows an example of the lay of a second length of slack cable around the spool assemblies.

FIG. 6 illustrates a "U" loop path over which, e.g., 14 feet or less of slack cable can be stored inside the cabinet 10. Specifically, the cable enters the open top of the cabinet and is safely guided over part of the circumference of the bend limiter spool at the upper right in FIG. 6. The cable descends inside the cabinet to loop beneath a lowermost spool positioned on the center track 20b, rises to be guided over the bend limiter spool at the upper left in FIG. 6, and exits from the top of the cabinet. Next, the lowermost spool on the center track 20b is moved downward to a position on the track where the spool contacts the slack cable, and is fixed at a position where the cable has an optimum lay for storage inside the cabinet 10.

FIG. 7 illustrates a "W" loop path over which, e.g., 14 to 27 feet of slack cable can be stored inside the cabinet 10. As in the FIG. 6 arrangement, the cable enters the open top of the cabinet and is safely guided over part of the circumference of the bend limiter spool at the upper right in FIG. 7. Approximately half way toward the bottom of the cabinet, the cable is guided over a spool 32 positioned on the right-side track 20c and closer to the right side wall 24 of the cabinet enclosure. The cable descends to loop beneath a spool positioned toward the bottom of the track 20c, rises to loop over a spool positioned toward the top of the center track 20b, descends to loop beneath a spool positioned toward the bottom of the left-side track 20a, and rises close to the left side wall 22 to be guided over the bend limiter spool at the upper left in FIG. 7 to exit from the top of the cabinet. Next, the two spools toward the bottom of the left and the right side tracks 20a, 20c are moved downward to positions where the spools contact the slack cable, and are fixed at such positions to provide the cable with an optimum lay for storage inside the cabinet 10.

FIG. 8 illustrates a double "W" loop path over which, e.g., 27 to 54 feet of slack cable can be stored inside the cabinet 10. Specifically, the cable is routed over the spools on the tracks 20a, 20b, 20c as in the single W loop path described above for FIG. 7. Instead of exiting from the top of the cabinet 10, however, the cable is routed about the bend limiter spool atop the right side track 20c. The cable then repeats the W loop path, and is guided over the bend limiter spool at the upper left in FIG. 8 and to exit from the top of the cabinet. The two spools positioned toward the bottom of the left and the right side tracks 20a, 20c are moved downward and fixed at positions where the cable has an optimum lay for storage inside the cabinet 10.

FIG. 9 illustrates a "W-O-W" loop path over which, e.g., more than 54 feet of slack cable can be stored inside the cabinet 10. Specifically, the cable is first routed over the spools on the tracks 20a-20c as in the single W loop path described above for FIG. 7. Instead of exiting from the top of the cabinet, however, the cable is guided about a spool positioned near the top of the center track 20b and below the level of the bend limiting spools atop the side tracks 20a, 20c. The cable then enters an "O" loop wherein it descends to loop beneath a spool positioned near the bottom of the center track 20b, and the cable is coiled one or more times about the bottom center spool and a spool located a certain distance above it on center track 20b, as many times as needed to take up a certain amount of slack. The cable then rises out of the "O" loop and is routed through a second "W" loop path starting at the bend limiting spool atop the right-side track 20c. The two spools positioned toward the bottom of the two side tracks 20a, 20c are moved downward and fixed at positions where the cable has an optimum lay for storage inside the cabinet 10.

While the foregoing represents preferred embodiments of the invention, it will be understood by those skilled in the art that various modifications and changes may be made without departing from the spirit and scope of the invention, and that the invention includes all such modifications and changes as are within the bounds of the following claims.

We claim:

1. Apparatus for storing slack fiber optic cabling, comprising:
    a cabinet enclosure having a front opening for allowing access to cabling when stored inside the enclosure;
    at least three elongated spool tracks mounted parallel with one another inside the enclosure;
    a number of cable spool assemblies each of which includes a cylindrical spool having a circumference dimensioned to guide a length of fiber optic cabling in a desired path with at least a certain minimum cable bend radius, and a mounting mechanism constructed and arranged for (i) mounting the spool on a corresponding spool track for sliding movement to a desired position along the track, and (ii) fixing the spool at the desired position;
    the cabinet enclosure forms a top opening for ingress and egress of slack fiber optic cabling to be stored;
    two cable spool assemblies are fixed in corresponding positions on left side and right side spool tracks near the top opening of the cabinet enclosure, so that the two cable spool assemblies define bend limiters for cabling that enters into and exits from the top opening of the enclosure; and
    at least one cable spool assembly is mounted for movement to a desired position along the left side spool track, at least one cable spool assembly is mounted for movement to a desired position along the right side spool track, and at least two cable spool assemblies are mounted for movement to desired positions along a third spool track intermediate the left and the right side spool tracks;
    wherein slack fiber optic cabling of various lengths can be stored in the cabinet enclosure with an optimum lay and without damaging fibers of the cabling when the cabling is guided over one or more selected spools of the moveable spool assemblies, and the selected spools are moved to and fixed at certain positions on their associated spool tracks.

2. Apparatus according to claim 1, wherein the cabinet enclosure is constructed and arranged to be fixed externally on an outside surface of another cabinet that encloses equipment to which the cabling is routed.

3. Apparatus according to claim 2, wherein a wall of the cabinet enclosure has a number of mounting holes for fasteners to engage the other cabinet.

4. Apparatus according to claim 1, wherein each spool track is formed by a pair of elongated bars each having a generally "Z" shaped cross section.

5. Apparatus according to claim 1, wherein each spool track has a central slot over the length of the track.

6. Apparatus according to claim 5, wherein the mounting mechanisms of the spool assemblies include a bolt having a head dimensioned to be seated behind the slot of a given spool track.

7. Apparatus according to claim 6, wherein each spool assembly includes front and back plates fixed at each axial end of the cylindrical spool, and the plates are dimensioned to keep cabling that is guided by the spool from sliding off the spool.

8. Apparatus according to claim 7, wherein the front and the back plates each have a central opening for passing the bolt of the mounting mechanism axially through the spool.

9. Apparatus according to claim 8, including a knob dimensioned and formed to engage a forward end of the bolt and thus fix the spool at a desired position on a corresponding spool track.

10. Apparatus according to claim 1, wherein the cylindrical spool has an outer diameter of about four inches.

11. Apparatus according to claim 1, wherein the cabinet enclosure has a height of about 83 inches.

12. Apparatus according to claim 1, wherein the cabinet enclosure is about six inches deep.

* * * * *